United States Patent

Sharma et al.

[11] 4,061,841
[45] Dec. 6, 1977

[54] FEEDTHROUGH ASSEMBLY FOR LITHIUM-IRON SULFIDE CELL

[75] Inventors: Ram A. Sharma, Sterling Heights; Walter J. Wright, Utica; Richard A. Murie, Sterling Heights, all of Mich.

[73] Assignee: General Motors Corporation, Detroit, Mich.

[21] Appl. No.: 787,875

[22] Filed: Apr. 15, 1977

[51] Int. Cl.² .................................. H01M 6/36
[52] U.S. Cl. ........................... 429/112; 429/174
[58] Field of Search ............................ 429/112, 174

[56] References Cited

U.S. PATENT DOCUMENTS 3,844,842 10/1974 Sharma et al. .................. 429/112 X Primary Examiner—Charles F. LeFevour
Attorney, Agent, or Firm—George A. Grove

[57] ABSTRACT

In an electrochemical cell having a molybdenum terminal rod extending through a metallic housing, a feedthrough assembly for insulating the terminal rod from and bonding it to the housing. The assembly comprises an insulating body of aluminum nitride, yittria or mixtures thereof surrounding the rod. The terminal rod is welded to a molybdenum ring integrally bonded to the insulating body. Also integrally bonded to the insulating body is a second molybdenum ring, which is electrically insulated from the first ring and is employed to attach the insulator to the housing. In a preferred embodiment, the construction is employed in a lithium-iron sulfide cell to hermetically seal the terminal rod to the housing.

4 Claims, 2 Drawing Figures

FEEDTHROUGH ASSEMBLY FOR LITHIUM-IRON SULFIDE CELL

BACKGROUND OF THE INVENTION

This invention relates generally to high temperature, secondary electrochemical cells and batteries of such cells. More particularly, it relates to a positive terminal construction for a lithium/lithium halide/iron sulfide cell.

Lithium/lithium halide/iron sulfide cells, which are frequently simply referred to as lithium-iron sulfide cells, are well known in the prior art. Such cells typically employ metallic lithium as the reactant in negative electrodes. The reactant of the positive electrode is generally iron sulfide or iron disulfide. A suitable molten salt electrolyte maintained at a temperature in excess of 400° C is employed to provide the necessary ionic conduction between the electrodes.

The components of a lithium-iron sulfide cell are usually assembled within a stainless steel outer housing. Electrical connection is generally provided between the housing and the negative electrode so that the housing serves as the negative terminal of the cell.

One of the major problems encountered in constructing a lithium-iron sulfide cell involves the design of the positive terminal for the cell. The prior art practice is to use a metallic rod to connect the positive electrode to the external circuit. The metal chosen must be a good conductor of electricity and inert to chemical attack by the cell environment. Typically tungston or molybdenum is chosen.

In order to connect the positive electrode to the external circuit, the metallic terminal rod extends through the outer housing. Passing the rod through the housing, which also serves as the negative terminal, presents several major problems. The positive terminal rod must be insulated from the housing. The insulator material must be carefully chosen to perform its function under the operating conditions of the cell and particularly at the operating temperature of the cell. Further, the insulating material must be inert to chemical reaction with the components of the cell and particularly with the positive electrode reactant. Another problem involved in passing the positive terminal through the outer housing is that the cell must be constructed airtight. Air reacts with the reactants in the electrodes, reducing their effectiveness in the cell reaction. Leakage of air into the cell will shorten the cell's lifetime and reduce its current output. Creating a hermetic seal is complicated because of the elevated operating temperatures of the cell. During its lifetime, the cell is frequently cycled between ambient temperatures and about 450° C. Because such a large temperature change is involved, the thermal coefficients of expansion of the materials employed to seal the positive terminal and the outer housing are a critical factor to be considered. Even small differences in the expansion coefficient of the materials as compared to the housing and positive terminal will cause the seal to fail as the temperature changes.

In a lithium-iron sulfide cell, the construction which includes the positive terminal rod and insulates it from the housing, while sealing it thereto, is commonly termed a feedthrough assembly. A prior art feedthrough assembly now commonly used employs a mechanical seal. There a ceramic insulator sheath is closely fitted around the terminal rod. The rod and sheath are passed through the male portion of a compression fitting which has been welded to the cell housing. A stainless steel compression nut is then turned down about the threads of the male portion and the seal is effected. The chief disadvantage in using such a mechanical seal is that it does not remain airtight. Some investigators have proposed that the terminal rod, the insulator and the outer housing can be joined together by brazing. However, known brazing materials react with the constituents of the cell, thus reducing active cell material and destroying the seal.

Therefore, in view of the problems described above, it is an object of the present invention to provide an improved construction of a feedthrough assembly for an electrochemical cell such as a lithium-iron sulfide cell. It is a more specific object of the present invention to provide a feedthrough assembly having an insulator body formed of aluminum nitride, yittria or mixtures thereof and having molybdenum connectors embedded therein for sealing the insulator to the cell housing and to the terminal rod. This construction permits a durable, hermetic seal to be formed between the terminal and the housing via the molybdenum connectors. These and other objects of the invention will become more readily apparent from the following description.

SUMMARY OF THE INVENTION

In accordance with the present invention a feedthrough assembly is provided for use in an electrochemical cell. When employed in a lithium-iron sulfide cell, the improved feedthrough assembly provides an electrically insulating seal between the molybdenum terminal rod and the stainless steel housing which serves as the negative terminal.

In a preferred embodiment, the subject feedthrough assembly includes an annular ceramic insulator that is disposed about the terminal rod and is impermeable to air or the contents of the cell. Suitable insulating materials include aluminum nitride, yittria or mixtures thereof, together with any additives helpful to form a dense body of these materials. The terminal rod is welded about its periphery to an encircling molybdenum ring that is also at least partially embedded in the surface of the ceramic insulator. This weld seals the terminal rod to the molybdenum ring-insulator assembly. A second molybdenum ring, also at least partially embedded in the surface of the insulator and encircling the rod but insulated from it, is joined to the outer housing by a suitable welding procedure or the like. The second weld completes the hermetic seal between the terminal rod and the housing. The two molybdenum connector rings are physically separate and electrically insulated from each other. Each ring is embedded in the insulator so that a hermetic bond is formed between it and the ceramic insulating materials. The materials employed to construct the subject feedthrough assembly have similar coefficients of expansion. Further, effect of differences in the expansion coefficients is minimized by the subject construction and especially by the embedded molybdenum bodies. Thus, the seal remains airtight despite the large temperature changes to which the cell is subjected.

In the practice of the present invention, it is particularly advantageous to weld the one molybdenum ring to the terminal rod employing a molybdenum-rhenium fillet. The second embedded molybdenum body can easily be joined to the housing by an intermediate ring constructed of metal chosen from the group consisting of tantalum, molybdenum or their alloys. Joining the second molybdenum body to the metallic ring and welding the metallic ring to the stainless steel housing affects a hermetic seal between the feedthrough assembly and the housing.

BRIEF DESCRIPTION OF THE DRAWINGS

The present invention wll be further illustrated with reference to the accompanying drawings wherein.

DETAILED DESCRIPTION OF THE PREFERRED EMBODIMENT

Figure 1:
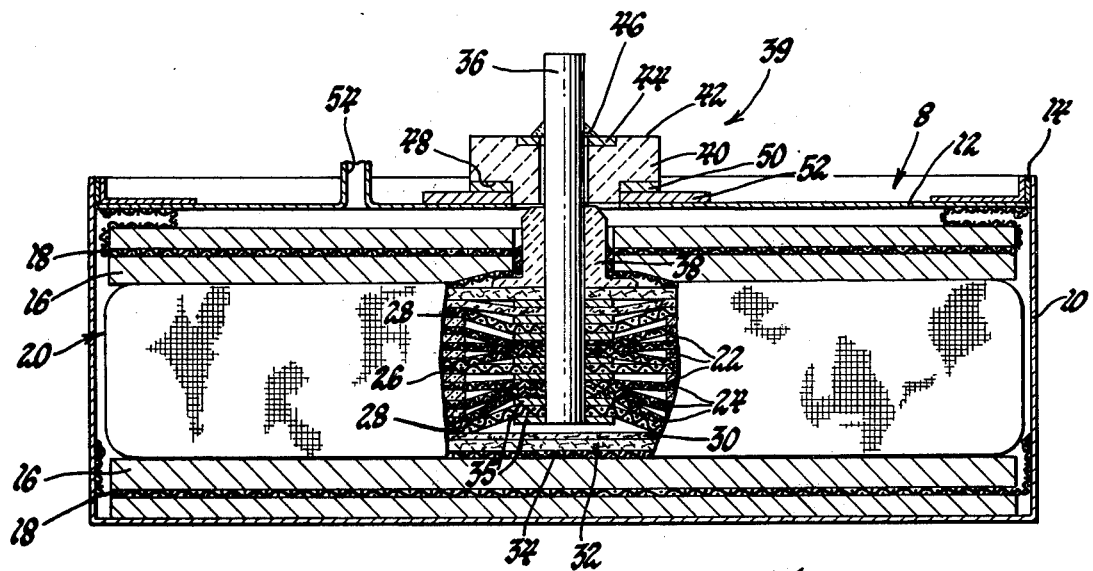
FIG. 1 is a cross-sectional view of a secondary electrochemical cell having the improved feedthrough assembly.

Referring now to FIG. 1, a lithium-iron sulfide cell 8 is illustrated which utilizes the present invention. The cell 8 is encased within a right circular cylindrical stainless steel can housing 10 having an outside diameter of about 11.5 centimeters and a height of about 3.5 centimeters. A stainless steel top 12 is welded to the upper edge of the can 10 along the abutting can-top flanges 14. Contained within and situated near the top and bottom of the housing 10 are two negative elecrodes 16. The negative electrodes 16 are constructed of a lithium-aluminum alloy, containing 55 mole percent lithium and have a porosity of about 30% in the charged state. The electrodes 16 are shaped as flat discs and have a diameter of 11.2 centimeters. Stainless steel screens 18 embedded in the electrodes 16 support and position them in the housing 10. Spotwelding these screens 18 to the stainless steel housing 10 further serves to electrically connect the negative electrodes 16 to the housing 10 and permit the housing to serve a negative terminal of the cell 8.

Sandwiched between the negative electrodes 16 is the positive electrode 20. The positive electrode 20 has an overall thickness of 1.5 centimeters and a diameter of 10 centimeters. It comprises several layers of iron disulfide 22. Between the layers of iron disulfide 22 are laminae of porous current conductor sheets 24 which hold the iron disulfide 22 uniformly distributed throughout the electrode 20 and conduct current to all reaction sites within the electrode. Graphite cloth approximately 0.5 millimeters thick can be used as the current conductor sheets 24. Located about the middle of the stack of iron disulfide layers 22 and graphite conductor sheets 24 is a single sheet of molybdenum mesh 26 which also acts as a current conductor and improves the conductivity over an otherwise all graphite current collector.

The iron disulfide layers 22 and graphite sheets 24 is encased within a molybdenum mesh basket 28 to hold them together and provide an overall shape for the electrode 20. The basket is then wrapped with zirconia cloth 30. The zirconia 30 serves to prevent inter-electrode short circuiting and to contain the particles within the basket. It is approximately 0.76 mm thick, is 83% porous and is commercially available as 5-H satin weave. The assembly is further wrapped in open woven boron nitride cloth 32. A stainless steel enclosure screen 34 is then placed about the boron nitride wrapping 32 in order to hold it in place and to firm up the electrode 20.

Within the electrode assembly 20, molybdenum washers 35 are electron beam welded to the molybdenum mesh basket and to the molybdenum mesh centermost current collector 26. The molybdenum rod 36 which will serve as the positive terminal is slipped through the holes in the molybdenum washers 35. After an axial compressive force is applied to compress the graphite cloth between the molybdenum washers 35, the molybdenum washers 35 are welded to the molybdenum terminal rod 36. A sheath of boron nitride 38 encircles the molybdenum rod 36 and insulates it where it extends through a hole located in the center of the upper, negative electrode 16.

Figure 2:
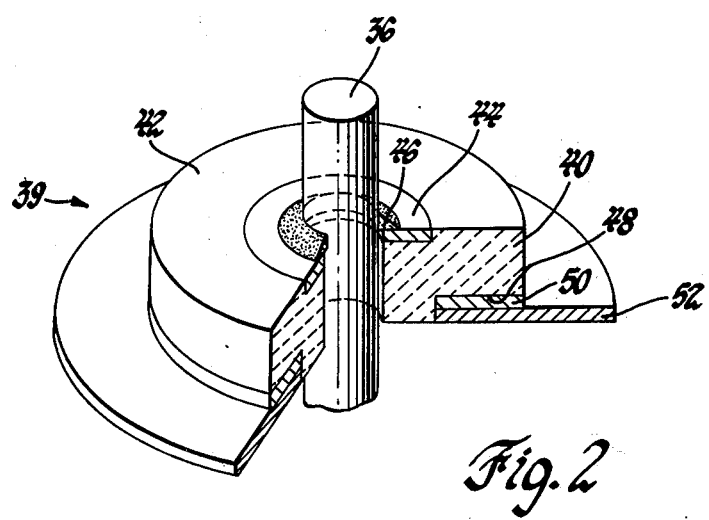
FIG. 2 is an enlarged view of the feedthrough assembly in perspective, partly broken away.

The feedthrough assembly of the present invention comprises the molybdenum rod 36 and an insulator assembly 39, seen in FIGS. 1 and 2. The insulator assembly 39 is located about the molybdenum rod 36 where it extends through the stainless steel top 12. It includes an aluminum nitride insulator body 40 in the shape of a hollow right circular cylinder having an outer diameter of 2.5 cm. and an inner diameter of 5 mm. Embedded into the face 42 of the insulator body 40 that is remote from the housing top 12 is a molybdenum ring 44 which surrounds the molybdenum rod 36 and is adjacent to it. A hermetic seal is formed between this embedded molybdenum ring 44 and the terminal rod 36 by a weld formed with the aid of a molybdenum-rhenium fillet 46.

Embedded into the face 48 of the insulating body 40 which is adjacent to the cell 8 is a second molybdenum ring 50. This molybdenum ring 50 also surrounds the molybdenum rod 36 but is electrically insulated from the molybdenum rod by a portion of the insulator body 40 as best seen in FIG. 2. The second molybdenum body 50 is hot pressed to a tantalum washer 52 that is similarly insulated from the molybdenum rod 36. The tantalum washer 52 is in turn welded to the stainless steel top 12. Electrically insulating the molybdenum rod 36 from the second molybdenum body 50, the tantalum washer 52 and the stainless steel top 12 prevents the cell 8 from short circuiting. Where the bonds between each of the components of the feedthrough assembly are carefully made, a hermetic seal between the positive terminal molybdenum rod 36 and the outer housing 12 is effected.

In a preferred embodiment the subject insulator assembly 39 was formed in a graphite die of the type that is conventionally used in hot pressing ceramic or metal powders. The graphite die which was used had three sections. The first section consisted of a flat disc with a circular recess in one flat surface. Into the recess was placed a tantalum washer. The tantalum washer was formed by punching out the desired shape from a sheet of tantalum, 0.5 mm thick. The washer had an outer diameter of 3.8 cm and an inner diameter of 1.4 cm. After the tantalum washer was positioned within the first section, the second section of the graphite die in the shape of a hollow cylinder having an inner diameter of 2.5 cm was fitted to the first. After the sections were fitted, the tantalum washer was adjacent to and concentric with one end of the hollow of the second die. Into the graphite die and adjacent to the tantalum washer was then placed a washer of molybdenum foam. The washer had been previously machined on a lathe from a piece of molybdenum from which was 60 to 70% porous so that its outer diameter was 2.5 cm, its inner diameter was about 1.2 cm and its thickness was 6 mm. The diameter dimensions do not change during hot pressing. However, the thickness of the washer will be reduced during hot pressing by a factor of three. Thus, after hot pressing the embedded molybdenum will be non-porous and approximately 2 mm thick.

After the molybdenum washer had been positioned within the graphite die, the graphite die was filled with 10 grams of powdered aluminum nitride (including the holes in the tantalum and molybdenum washer), having a particle size of 2-3 microns. The aluminum nitride was tamped so that the final assembly would be free of voids. Onto the surface of the aluminum nitride was placed another molybdenum foam disc, which had been also machined on a lathe. The dimensions of this molybdenum disc were 1.2 cm outer diameter and 6 mm inch thick. This disc did not have a hole through its center. The third section of the die consists of a graphite punch which was positioned into the hollow of the second die member by slip fitting. The graphite die and its contents were then placed into a conventional hot press. A vacuum was pulled so that the pressure was less than $10^{-4}$ atm. The die and its contents were heated to about 1800° C over the course of approximately 1½ hours at an approximately even rate. After the temperature had reached 1,000° C, the contents of the die were pressurized to 5,000 psi by a force applied to the punch. The die and its contents remained at 1800° C and 5,000 psi for approximately 1½ hours so as to sinter and fully densify the molybdenum bodies and the aluminum nitride. At the same time the molybdenum bodies are bonded to the aluminum nitride so that one solid body is formed. The time to which the die and its contents are subjected to these conditions must be long enough so that the aluminum nitride will sinter into a non-porous body. However, it is desirable to minimize the time so as to limit the recrystallization and resulting embrittlement of the molybdenum. After these operations had been completed, the temperature was reduced over a period of approximately 6 hours until it had cooled to room temperature. The pressure was then relieved and the die disassembled.

The insulator assembly was then cleaned off. Scale which had formed on the tantalum surface during hot pressing was ground off. The surface of the molybdenum body which was adjacent to the punch was also ground flat. A hole 5 mm in diameter was then drilled through the axis of the insulator assembly using a diamond core drill and water cooling.

The insulator assembly 39 was thus formed so as to integrally bond into a single unit the insulator body 40, the molybdenum bodies 44 and 50 and the tantalum ring 52. It was then joined to the stainless steel top 12 before the top was joined to the housing 10. The joining of the insulator assembly 39 was accomplished by electron beam welding the tantalum ring 52 to the stainless steel top 12. The electron beam was adjusted to 100 kilovolts and 5 milliamps and the welding conducted under a vacuum in such a fashion that the stainless steel became the parent metal.

The cell 8 was then assembled by first positioning the bottom negative electrode 16 and the positive electrode 20 (including the attached terminal rod 36) within the stainless steel housing 10. To the stainless steel top 12 carrying the insulator assembly 39 was welded the stainless steel screen 18, thereby attaching the upper negative electrode 16. The stainless steel top 12 was then positioned so as to close the housing 10. As the top 12 was positioned, the molybdenum rod 36 was slipped through the hole drilled along the axis of the insulator assembly 39. The top 12 was then permanently and hermetically bonded to the upper edge of the can 10 along the abutting can top flanges 14 by tungsten inert gas welding. The rod 36 was then welded to the molybdenum body 44 which had been integrally bonded to the remote surface 42 of the insulator body 40. An acceptable seal was obtained by fillet 46 consisting of a ductile molybdenum alloy which compensates for the brittleness of the body 44 that results from recrystallization during hot pressing. The fillet 46 comprises a ring preformed of an alloy containing equal parts by weight of rhenium and molybdenum. The ring had an inner diameter of 5 mm and a 45° chamfer so that it could be easily slipped over the molybdenum rod 36 and fit adjacent to the embedded molybdenum body 44. The fillet 46 permitted the molybdenum rod 36 to be electron beam welded to the embedded molybdenum body 44. The electron beam was adjusted to 100 kilovolts in 5 milliamps. This procedure enables a durable and hermetic seal to be formed between the molybdenum rod 36 and the insulator assembly 39.

After the cell was assembled it was filled with a lithium chloride-potassium chloride eutectic electrolyte. The cell was heated to 475° C and the air was evacuated from it through the filler tube 54. Molten electrolyte was then introduced into the cell through the filler tube 54. The cell was only partially filled with the electrolyte in order to compensate for the volumetric increase that the electrodes will undergo during the discharge of the cell. After the molten electrolyte had been added, the filler tube 54 was pinched and welded shut.

Thus, the assembly of the cell was completed. The cell is operated by connecting it to a circuit and raising its temperature to 450° C. When the cell is not operated it may be cooled to ambient temperatures. The subject feedthrough assembly permits a ductile, non-porous connection to be made between the molybdenum rod and the cell's outer housing. The seal is hermetic and air cannot leak into the cell and thereby interfere with the cell's reactants. Further the materials and the design of the feedthrough assembly are such that the seal will remain hermetic as the cell is subjected to extreme temperature changes. At the same time the feedthrough assembly insulates the molybdenum rod so as to prevent the cell from short circuiting.

While in the particular embodiment disclosed the subject feedthrough assembly was employed in a lithium-iron sulfide cell, it could, of course, be used in conjunction with other electrochemical cells if desired. As the feedthrough assembly is constructed of material such as molybdenum and aluminum nitride, which are known to be inert to a wide variety of chemicals, it has application in any cell where those materials of the electrochemical cell which contact the feedthrough assembly do not react with it.

In the above example the metallic rod was constructed of molybdenum. However, it is to be understood that suitable alloys of molybdenum could be used. For instance, TZM, a molybdenum alloy containing small amounts of zirconium and titanium, is a suitable terminal rod material and will also take a weld.

In the feedthrough assembly described above the insulator material was aluminum nitride because it is inert to the constituents of the cell, it is a good electrical insulator and it has a thermal expansion coefficient virtually identical to the molybdenum rod. When the cell is to be operated it will be heated from ambient temperatures to approximately 450° C. This large temperature change will cause the materials used to construct the feedthrough assembly to expand. Because the change in temperature is so large, even small differences in the coefficients of expansion for the molybdenum rod and for the insulating body could have a disastrous effect upon the seal.

However, aluminum nitride is not easily formed into a dense mass. It is necessary, therefore, to hot press its powder at high temperatures for an extended period of time. The extreme conditions required for hot pressing aluminum nitride cause the molybdenum bodies embedded in the insulator to recrystallize and become brittle. The more brittle the molybdenum, the more difficult it is to weld it to the terminal rod. The temperature and time of hot pressing can be mitigated by mixing suitable sintering additives with the aluminum nitride.

Yittrium oxide is another material which is known to be a good insulator and could be employed to form the insulator body. Yittrium oxide can be easily formed into an insulator body by compacting and sintering according to conventional powder technology. It can also be hot pressed under conditions that are not nearly as severe as those required for aluminum nitride. It is also within the scope of the invention to use mixtures of yittria and aluminum nitride. When aluminum nitride has been mixed with some yittria, the mixture can be hot pressed at lower temperatures and for shorter periods than hot pressing aluminum nitride alone. This reduces the embrittlement of the embedded molybdenum.

Under the present invention the terminal rod is welded to a molybdenum body which has been embedded in the insulator body. It is normally possible to weld two pieces of molybdenum together without additional weld metal. However, in hot pressing insulator bodies of aluminum nitride, there is recrystallization of the embedded molybdenum body. This recrystallization causes any direct weld to be brittle and crack. However, the brittleness of the embedded molybdenum can be compensated for and a satisfactory weld can be obtained with the aid of ductile intermediate weld material or fillet. Rhenium is such a ductile metal and can be employed alone as the fillet. An even better weld can be obtained if the fillet consists of a molybdenum-rhenium alloy. While in the preferred embodiment A 50/50 mixture of molybdenum and rhenium is used, the composition of the alloy can be varied according to the amount of recrystallizing that the molybdenum body has undergone.

The present invention contemplates that the components of the cell are to be encased within a metallic housing. If the embedded molybdenum body is brittle, it is very difficult to weld the second embedded molybdenum body directly to the metallic housing. However, we have found that it is possible to join the molybdenum body to a suitable intermediate layer which in turn can be bonded to the metallic housing. Although in the particular embodiment disclosed the tantalum ring was used as an intermediate, it would also be possible to use a ductile molybdenum washer as an intermediate. The molybdenum washer can be welded to the embedded molybdenum body by means of suitably ductile weld material such as a molybdenum-rhenium alloy described above. The molybdenum washer, which has not been subjected to recrystallization during hot pressing, is sufficiently ductile to enable it to be welded directly to the outer housing. A tantalum washer is preferred because it can be bonded to the embedded molybdenum body during hot pressing of the insulator body, making it unnecessary to carry out a seperate welding step. Even where tantalum is employed, the second embedded molybdenum body remains essential because tantalum cannot be bonded directly with aluminum nitride. Further, a tantalum washer does not become brittle during hot pressing.

In the preferred embodiment disclosed the housing was constructed of 304 stainless steel, it could, of course be constructed of any metal which is inert to the components of the cell with which it is in contact and which can be bonded to a molybdenum or a tantalum washer.

The present invention can be practiced in any situation where it is desired to insulate the terminal of an electrochemical cell from the metallic outer housing of the cell and to seal the components of the cell within the outer housing. It is not essential to the present invention that the metallic housing serve as the negative electrode, although it is frequently convenient to construct the cell in that fashion. Neither is it essential that the metallic rod serve as the positive terminal. In an electrochemical cell where a molybdenum rod is an appropriate means to form the negative terminal, the present invention could be employed to seal and insulate the negative terminal.

While this invention has been disclosed primarily in terms of certain embodiments thereof, it is not intended that it be limited thereto but rather only to the extent set forth in the claims that follow.

What is claimed is:

1. In an electrochemical cell comprising electrodes encased within a housing, there being a metallic rod comprised of molybdenum extending through the housing, said rod being in electrical connection with one electrode of the cell and serving as one terminal of the cell, a sealing and insulating construction for insulating the metallic rod from and bonding the rod to the outer housing comprising an electrically insulating body comprising a material selected from the group consisting of aluminum nitride, yittria, or mixtures thereof surrounding said rod and insulating it from said housing,
    a first molybdenum body which is integrally bonded to the insulating body and surrounding the rod and which is welded to said rod, and
    a second molybdenum body which is integrally bonded to the insulating body and surrounding the rod but spaced apart and electrically insulated from both the rod and the first molybdenum body, and is bonded to the housing, said construction, the terminal rod and the outer housing, together with the bonds between them cooperating to produce a hermetic seal.

2. In an electrochemical cell comprising electrodes encased within a housing, there being a metallic rod comprised of molybdenum extending through the housing, said rod being in electrical connection with one electrode of the cell and serving as one terminal of the cell, a sealing and insulating construction for insulating the metallic rod from and bonding the rod to the outer housing comprising an electrically insulating body comprising a material selected from the group consisting of aluminum nitride, yittria, or mixtures thereof surrounding said rod and insulating it from said housing,
    a first molybdenum body which is at least partially embedded in the insulating body and surrounding the rod and which is welded to said rod
    a second molybdenum body which is at least partially embedded in the insulating body and surrounding the rod but spaced apart and electrically insulated from both the rod and the first molybdenum body, and a ring comprising molybdenum or tantalum, located intermediate said second molybdenum body and said housing and encircling the terminal rod but spaced apart from it, said ring being bonded to the second molybdenum body and bonded to the housing, the construction, the terminal rod and the housing, together with the bonds between them, cooperating to produce a hermetic seal.

3. In a lithium-iron sulfide battery of the type comprising a lithium electrode, a fused electrolyte containing a lithium halide salt, and an iron sulfide electrode, the respective electrodes each being in contact with the electrolyte and separated from each other by the electrolyte, all being contained in a metal housing which serves as the negative terminal, there being a rod comprised of molybdenum and extending through the housing, said rod being in electrical connection with the iron sulfide electrode and serving as the positive terminal of said cell, the improvement wherein the positive terminal is insulated from the housing and the contents of the battery are sealed within said housing by a construction comprising an electrically insulating body comprising aluminum nitride surrounding the rod and insulating it from said housing, a first molybdenum body which is at least partially embedded in the insulating body and which is bonded and hermetically sealed to said rod by a molybdenum-rhenium weld fillet, a second molybdenum body which is at least partially embedded in the insulating body and surrounding the rod but spaced apart and electrically insulated from both the rod and the first molybdenum body, and a tantalum ring encircling the rod but spaced apart from it and bonded to the second molybdenum body and bonded to the housing, the construction providing a hermetic seal between the housing and the rod.

4. In a lithium-iron sulfide battery of the type comprising a lithium electrode, a fused electrolyte comprising a lithium halide salt, and an iron sulfide electrode, the respective electrodes each being in contact with the electrolyte and separated from each other by the electrolyte, all being contained in a metal housing which serves as the negative terminal, there being a rod comprised of molybdenum and extending through the housing, said rod being in electrical connection with the iron sulfide electrode and serving as the positive terminal of said cell, the improvement wherein the positive terminal is insulated from the housing and the contents of the battery are sealed within said housing by a construction comprising an electrically insulating body comprising aluminum nitride surrounding the rod and insulating it from said housing, said body having opposite faces spaced apart along the axis of said rod, and positioned along the axis such that one face is adjacent to the housing and the other face is remote from the housing, a first molybdenum body which is embedded in the remote face of the insulating body and which surrounds the rod and is bonded and hermetically sealed to said rod by a molybdenum-rhenium weld fillet, a second molybdenum body embedded in the adjacent face of the insulating body and surrounding the rod but spaced apart and electrically insulated from both the rod and the first molybdenum body, and a tantalum ring encircling the rod but spaced from it and bonded to the second molybdenum body and bonded to the housing, the construction providing a hermetic seal between the housing and the rod.

* * * * *